(12) United States Patent
Lin

(10) Patent No.: US 11,933,965 B2
(45) Date of Patent: *Mar. 19, 2024

(54) LIGHT PATH ADJUSTMENT MECHANISM

(71) Applicant: Young Optics Inc., Hsinchu Science Park (TW)

(72) Inventor: Wei-Szu Lin, Hsinchu Science Park (TW)

(73) Assignee: YOUNG OPTICS INC., Hsinchu Science Park (TW)

(*) Notice: Subject to any disclaimer, the term of this patent is extended or adjusted under 35 U.S.C. 154(b) by 0 days.

This patent is subject to a terminal disclaimer.

(21) Appl. No.: 17/986,390

(22) Filed: Nov. 14, 2022

(65) Prior Publication Data

US 2023/0075682 A1    Mar. 9, 2023

Related U.S. Application Data

(63) Continuation of application No. 16/673,066, filed on Nov. 4, 2019, now Pat. No. 11,500,195.

(30) Foreign Application Priority Data

Nov. 30, 2018    (TW) .................................. 107142974

(51) Int. Cl.
| | |
|---|---|
| G02B 26/08 | (2006.01) |
| G02B 7/02 | (2021.01) |
| G02B 7/182 | (2021.01) |
| H01F 7/02 | (2006.01) |

(52) U.S. Cl.
CPC ............. *G02B 26/085* (2013.01); *G02B 7/02* (2013.01); *G02B 7/182* (2013.01); *G02B 26/0875* (2013.01); *H01F 7/02* (2013.01); *G03B 2205/0069* (2013.01)

(58) Field of Classification Search
CPC ........ G02B 26/085; G02B 7/02; G02B 7/182; G02B 26/0875; H01F 7/02; H01F 7/122; H01F 7/14; G03B 2205/0069

See application file for complete search history.

(56) References Cited

U.S. PATENT DOCUMENTS

| | | | |
|---|---|---|---|
| 10,120,144 B2 | 11/2018 | Rehnstrom et al. | |
| 11,500,195 B2* | 11/2022 | Lin | ................... G02B 26/0875 |
| 2010/0208347 A1 | 8/2010 | Kouma et al. | |

FOREIGN PATENT DOCUMENTS

| | | |
|---|---|---|
| CN | 201156111 Y | 11/2008 |
| TW | 201723631 A | 7/2017 |
| TW | M554179 U | 1/2018 |

* cited by examiner

*Primary Examiner* — Euncha P Cherry

(74) *Attorney, Agent, or Firm* — Muncy, Geissler, Olds & Lowe, P.C.

(57) ABSTRACT

A light path adjustment mechanism includes a support, a carrier, an optical plate member and a plurality of actuators. The carrier is disposed on the support and connected to the support via a first elastic member and a second elastic member. The carrier includes a first side, a second side opposite the first side, a third side and a fourth side opposite the third side, and each of the third side and the fourth side is located between the first side and the second side. The actuators are disposed on at most three sides of the first side, the second side, the third side and the fourth side, and the actuators are disposed at least on the first side and the third side.

20 Claims, 13 Drawing Sheets

1

LIGHT PATH ADJUSTMENT MECHANISM

CROSS-REFERENCE TO RELATED APPLICATIONS

This application is a continuation application of application Ser. No. 16/673,066 filed Nov. 4, 2019, the contents of which are incorporated by reference herein.

BACKGROUND OF THE INVENTION a. Field of the Invention

The invention relates generally to an optical mechanism, and more particularly to a light path adjustment mechanism.

b. Description of the Related Art

Nowadays, various image display technologies are widely used in daily life. In order to increase the resolution and picture quality of an image display device, a light path adjustment mechanism can be used to adjust propagation paths of light in the image display device to shift pixel images and thereby increase addressability. However, the number of components, weight and occupied space of a conventional light path adjustment mechanism is considerably large, and thus the entire mechanism is difficult to be miniaturized. Therefore, it is desirable to provide a simple, reliable, light and compact design of a light path adjustment mechanism.

BRIEF SUMMARY OF THE INVENTION

According to one aspect of the present disclosure, a light path adjustment mechanism includes a support, a carrier, an optical plate member and a plurality of actuators. The carrier is disposed on the support and connected to the support via a first elastic member and a second elastic member, an outer periphery of the carrier is connected with the first elastic member to form a first connection area and a second connection area, the outer periphery of the carrier is connected with the second elastic member to form a third connection area and a fourth connection area, the first connection area and the second connection area define a first middle area between the first connection area and the second connection area, the second connection area and a third connection area define a second middle area between the second connection area and a third connection area, the third connection area and the fourth connection area define a third middle area between the third connection area and the fourth connection area, and the fourth connection area and the first connection area define a fourth middle area between the fourth connection area and the first connection area. The optical plate member is disposed on the carrier, the actuators are disposed on at most three middle areas of the first, the second, the third and the fourth middle areas, and the actuators are disposed at least on the first middle area and the fourth middle area.

According to another aspect of the present disclosure, a light path adjustment mechanism includes a support, a carrier, an optical plate member and a plurality of actuators. The carrier is disposed on the support and connected to the support via a first elastic member and a second elastic member. The carrier comprises a first side, a second side opposite the first side, a third side and a fourth side opposite the third side, and each of the third side and the fourth side is located between the first side and the second side. The optical plate member is disposed on the carrier and tilts about a first axial direction and a second axial direction. The actuators are disposed on at most three sides of the first side, the second side, the third side and the fourth side, and the actuators are disposed at least on the first side and the third side. The first elastic member is connected to the support via a first fixed point, the carrier is connected to the first elastic member via a first connection point on an outer periphery of the carrier, and a connecting line between the first fixed point and the first connection point is not parallel to the first axial direction and the second axial direction.

According to another aspect of the present disclosure, a light path adjustment mechanism includes a support, a carrier and an optical plate member. The carrier is disposed on the support and connected to the support via a first flexible member and a second flexible member, the first flexible member and the second flexible member are disposed on two opposite sides of the carrier, the first flexible member is connected to the support via a first fixed point, the second flexible member is connected to the support via a second fixed point, the carrier is connected to the first flexible member via a first connection point and a second connection point on an outer periphery of the carrier, and the carrier is connected to the second flexible member via a third connection point and a fourth connection point on the outer periphery of the carrier. The optical plate member is disposed on the carrier and tilts about a first axial direction and a second axial direction. The first connection point and the second connection point are disposed on two opposite sides of the first axial direction, a distance between the first fixed point and the first connection point measured in the first axial direction is smaller than a total length measured from a reference point to the first connection point. The reference point is an intersection point crossed by a virtual line extending from the first fixed point in a direction parallel to the second axial direction and a virtual line extending from the first connection point in a direction parallel to the first axial direction, and the total length is a sum of lengths of all sections of the first flexible member connected between the first connection point and the reference point.

According to the above aspects, the light path adjustment mechanism may modify or change light paths to enhance image resolution, improve picture quality (e.g., eliminating dark regions or blurring image edges), or provide other beneficial effects. Moreover, the optical plate member is allowed to tilt about two distinct axes to four different positions simply by disposing two actuators on two adjacent sides (or two adjacent middle areas), which relies on the interaction between acting forces of the actuators and resilient forces of the elastic members to cause reciprocating motion of the carrier. This allows to reduce occupied space, weight and component number. Further, the elastic member may have multiple sections extending in different directions to, for example, reduce the resistance for tilting or rotating motions.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. Further, "First," "Second," etc, as used herein, are used as labels for nouns that they precede, and do not imply any type of ordering (e.g., spatial, temporal, logical, etc.).

The following description relates in general to a light path adjustment mechanism used with an optical system (e.g., a display device or a projector) to modify or change light paths to enhance perceived image resolution, improve picture quality (e.g., eliminating dark regions or blurring image edges), or provide other beneficial effects. Further, it should be understood that the light path adjustment mechanism is not limited to a specific arrangement and location in the optical system.

Figure 1:
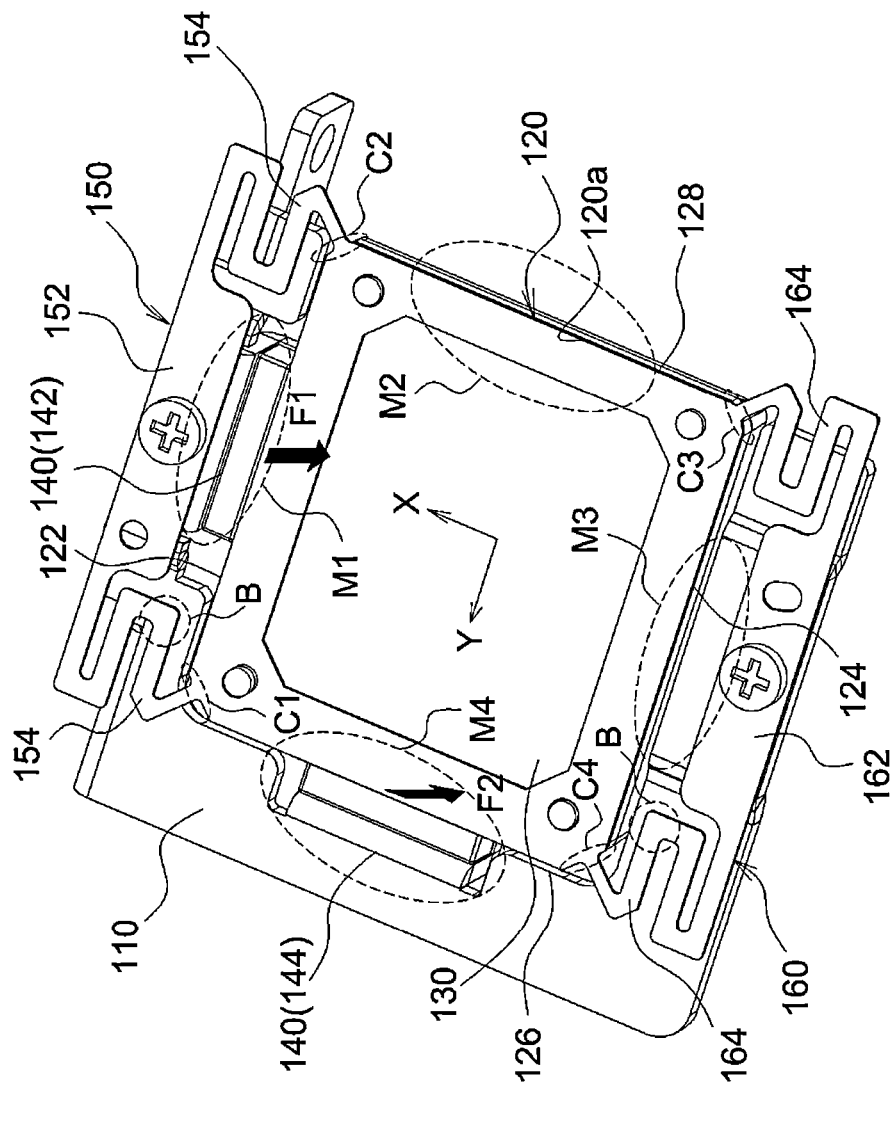
FIG. 1 shows a schematic diagram of a light path adjustment mechanism according to an embodiment of the invention.

FIG. 1 shows a schematic diagram of a light path adjustment mechanism according to an embodiment of the invention. With reference to FIG. 1, a light path adjustment mechanism 100 includes a support 110, a carrier 120, an optical plate member 130 and multiple actuators 140. The carrier 120 is disposed in the support 110 and connected to the support 110 by a first elastic member 150 and a second elastic member 160. In one embodiment, the carrier 120 may be a supporting frame or a lens mount that is separate from the optical plate member 130 or integrally formed as one piece with the optical plate member 130. In other embodiment, the carrier 120 may be an extension portion directly extending from the elastic member 150 and/or the elastic member 160 to support the optical plate member 130, but the invention is not limited thereto. In this embodiment, the carrier 120 includes a first side 122, a second side 124 opposite the first side 122, a third side 126, and a fourth side 128 opposite the third side 126. The third side 126 and the fourth side 128 are both located between the first side 122 and the second side 124. Therefore, a distance between the first side 122 and the second side 124 is larger than a distance between the first side 122 and the third side 126. The optical plate member 130 may be disposed on the carrier 120, and the optical plate member 130 is not limited to a specific type or structure, so long as it may change, at least to some extent, the traveling direction of incoming light beams. For example, the optical plate member 130 may be, but is not limited to, a lens or a mirror. The multiple actuators 140 may include a first actuator 142 and a second actuator 144, the first actuator 142 is disposed on the first side 122 of the carrier 120, and the second actuator 144 is disposed on the third side 126 adjacent to the first side 122. In this embodiment, the first actuator 142 is hold by the support 110 and disposed on the first side 122, the second actuator 144 is hold by the support 110 and disposed on the third side 126, and the first actuator 142 and the second actuator 144 are located on the same side of a diagonal line of the carrier 120. It should be noted the phrase "an actuator is disposed on or located on a certain side/area of a carrier" as used herein can be broadly defined to encompass that the actuator is in direct contact, not in contact with, or in immediate vicinity of the certain side/area of the carrier. Further, in this embodiment, the first elastic member 150 has a fixed part 152 and two movable parts 154 respectively connected with two ends of the fixed part 152, and the second elastic member 160 has a fixed part 162 and two movable parts 164 respectively connected with two ends of the fixed part 162. The movable parts 154 and 164 may rotate or twist, and the fixed parts 152 and 162 are connected with or secured to the support 110 by fasteners such as screws or pins. In this embodiment, the movable part 154 and the movable part 164 are disposed diagonally relative to the carrier 120, and each of the movable parts 154 and 164 may include at least one bending portion B to form two sections that are substantially parallel to two adjacent sides of the carrier 120 respectively. For example, as shown in FIG. 1, the two sections may include a first section parallel to the X-axis direction and a second section parallel to the Y-axis direction. Further, in this embodiment, an outer periphery 120a of the carrier 120 is connected with the first elastic member 150 to form a first connection area C1 and a second connection area C2, and the outer periphery 120a of the carrier 120 is connected with the second elastic member 160 to form a third connection area C3 and a fourth connection area C4. The first connection area C1 and the second connection area C2 define a first middle area M1 located therebetween, the second connection area C2 and the third connection area C3 define a second middle area M2 located therebetween, the third connection area C3 and the fourth connection area C4 define a third middle area M3 located therebetween, and the fourth connection area C4 and the first connection area C1 define a fourth middle area M4 located therebetween. In this embodiment, all middle areas M1-M4 overlap the outer periphery 120a of the carrier 120, and the first actuator 142 and the second actuator 144 are respectively disposed on the first middle area M1 and the fourth middle area M4. In other embodiment, except for the first middle area M1 and the fourth middle area M4, either the second middle area M2 or the third middle area M3 may be further provided with an actuator 140.

Figure 2A:
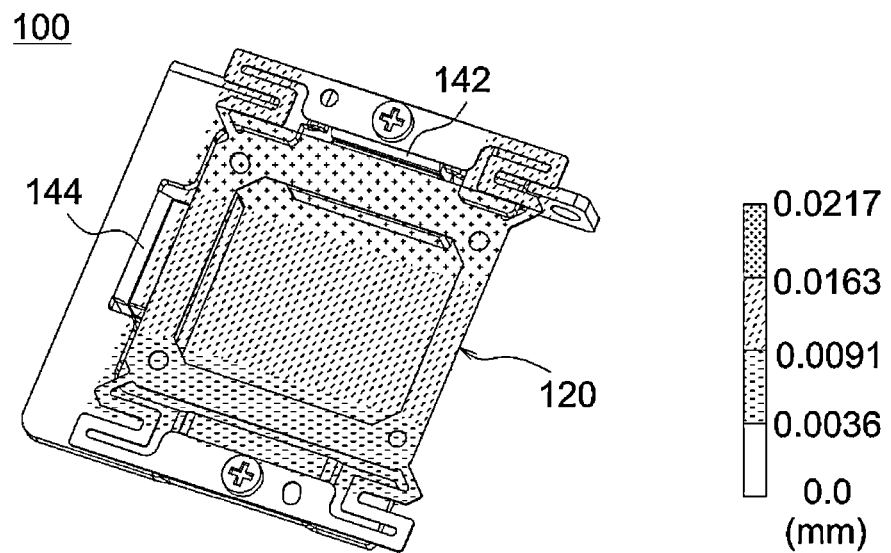
FIGS. 2A, 2B and 2C show force distribution plots of the carrier where at least one actuator operates to exert a forces on the carrier.
Figure 2B:
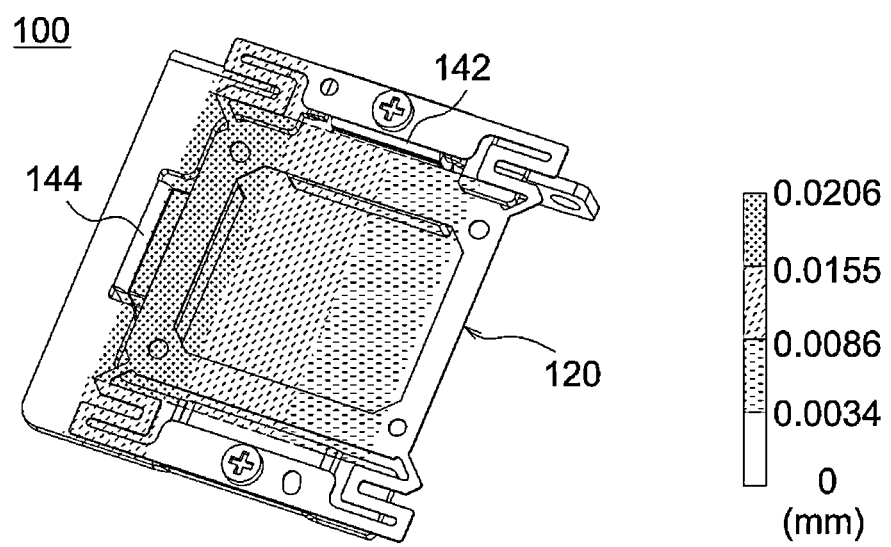
Figure 2C:
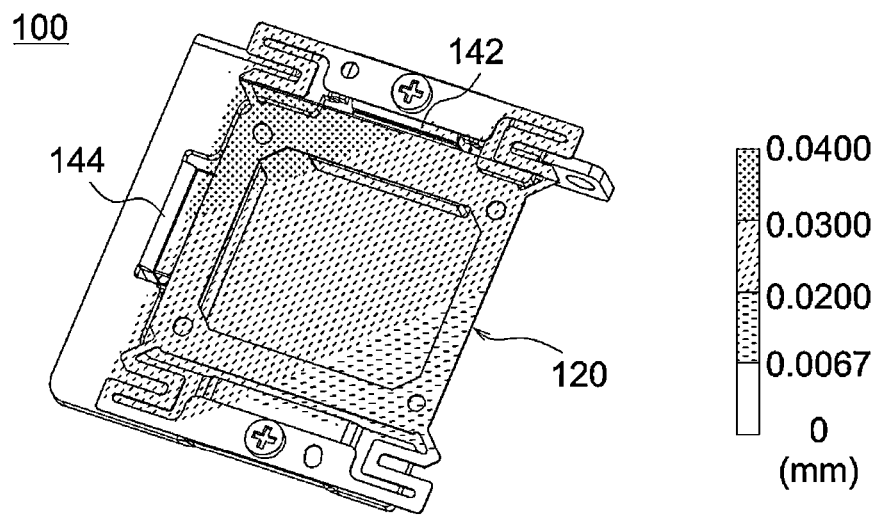
Figure 3:
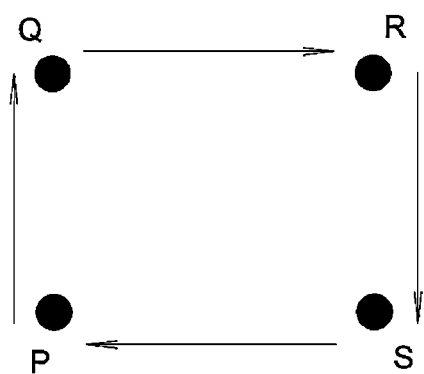
FIG. 3 shows a schematic diagram illustrating the effect of increasing perceived image resolution by a light path adjustment mechanism according to an embodiment of the invention.

When the first actuator 142 operates, the first actuator 142 may exert a force F1 on the first side 122 of the carrier 120. Moreover, when the second actuator 144 operates, the second actuator 144 may exert a force F2 on a third side 126 of the carrier 120. For example, the first actuator 142 may exert a downward force F1 on the first side 122 to allow the first side 122 of the carrier 120 to move downwardly. Under the circumstance, the elastic member 150 and/or the elastic member 160 simultaneously provides a reverse resilient force to force the carrier 120 to return to its original position. Therefore, the interaction of the force F1 and the resilient force of the elastic member 150 and/or the elastic member 160 allows the first side 122 of the carrier 120 to alternately tilt upwardly and downwardly, so that the optical plate member 130 on the carrier 120 may tilt about the Y-axis direction to reach various positions. Similarly, the second actuator 144 may exert a downward force F2 on the third side 126 to allow the third side 126 of the carrier 120 to move downwardly. Under the circumstance, the elastic member 150 and/or the elastic member 160 simultaneously provides a reverse resilient force to force the carrier 120 to return to its original position. Therefore, the interaction of the force F2 and the resilient force of the elastic member 150 and/or the elastic member 160 allows the third side 126 of the carrier 120 to alternately tilt upwardly and downwardly, so that the optical plate member 130 on the carrier 120 may tilt about the X-axis direction to reach various positions. In other embodiment, the actuators 142 and 144 may each exert an upward force on the carrier 120 to achieve similar effects of tilting the optical plate member 130. FIGS. 2A, 2B and 2C show force distribution plots of the carrier based on the deflection amount of the carrier, where at least one actuator operates to exert a force on the carrier. FIG. 2A shows the force distribution on the carrier where only the first actuator 142 operates, FIG. 2B shows the force distribution on the carrier where only the second actuator 144 operates, and FIG. 2C shows the force distribution on the carrier where the first actuator 142 and the second actuator 144 both operate. Because the carrier 120 may lean toward a position on which a maximum external force is applied, the motion of the carrier caused by the first actuator 142 and/or the second actuator 144 can be recognized by referencing FIGS. 2A-2C indicative of the degree of force (the deflection amount) on different portions of the carrier 120. For example, the optical plate member 130 on the carrier 120 is allowed to tilt about two different axes to reach various positions by alternating different control modes including: (1) only the first actuator 142 actuates; (2) the first actuator 142 and the second actuator 144 both actuate; and (3) only the second actuator 144 actuates, so as to change the traveling direction and propagation path of incoming light beams. In one embodiment, an image beam that intends to impinge upon the optical plate member 130 is deflected by the optical plate member 130 that rapidly and alternately tilts among four different positions to form four different pixel images P, Q, R and S shown in FIG. 3, thereby increasing the perceived image resolution at least by four times.

According to the above embodiments, the light path adjustment mechanism may modify or change light paths to enhance image resolution, improve picture quality (e.g., eliminating dark regions or blurring image edges), or provide other beneficial effects. Moreover, the optical plate member is allowed to tilt about two distinct axes to four different positions simply by disposing two actuators on two adjacent sides (or on the first middle area M1 and the fourth middle area M4) of the carrier, which relies on the interaction between acting forces of the actuators and resilient forces of the elastic members to cause reciprocating motion of the carrier. This allows to reduce occupied space, weight and component number. Further, the elastic member may have multiple sections extending in different directions (such as two extending sections substantially parallel to two adjacent sides of the carrier respectively) to, for example, reduce the resistance for tilting or rotating motions.

Figure 4:
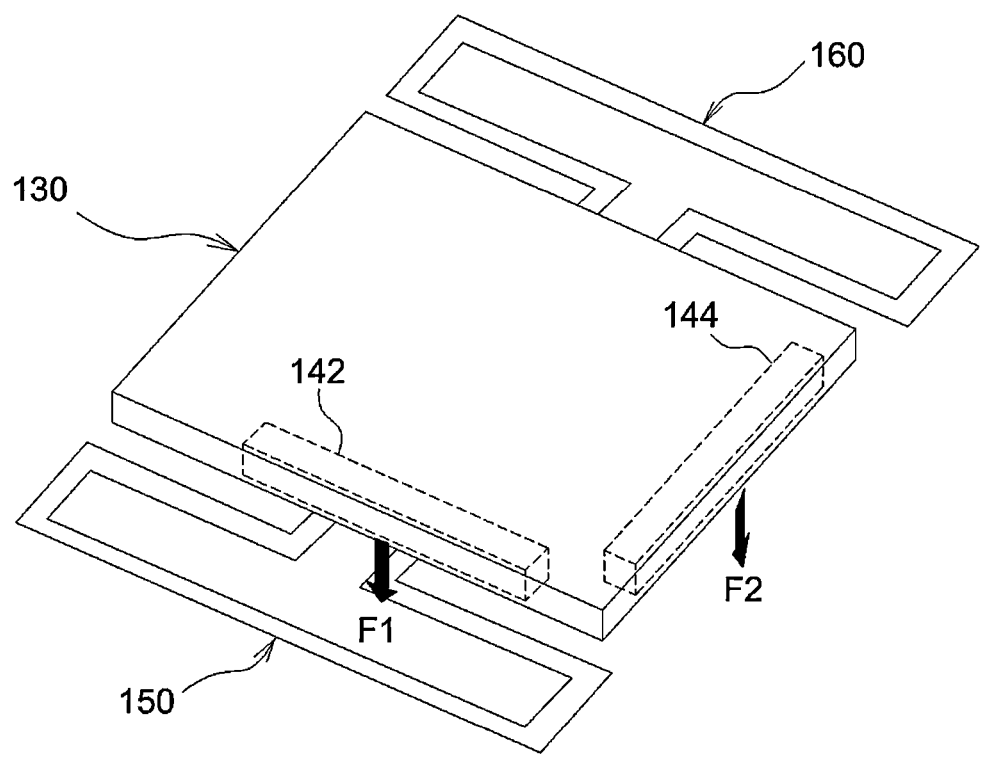
FIG. 4 shows a schematic diagram of a light path adjustment mechanism according to another embodiment of the invention.
Figure 5A:
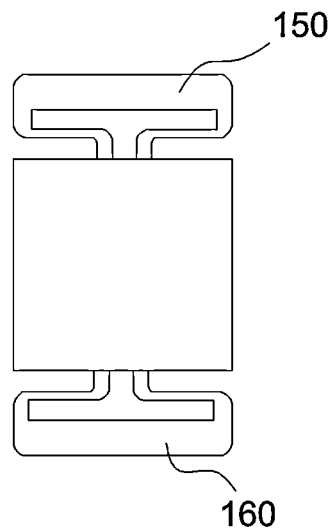
FIGS. 5A, 5B, 5C and 5D illustrate different shapes of an elastic member according to various embodiments of the invention.
Figure 5B:
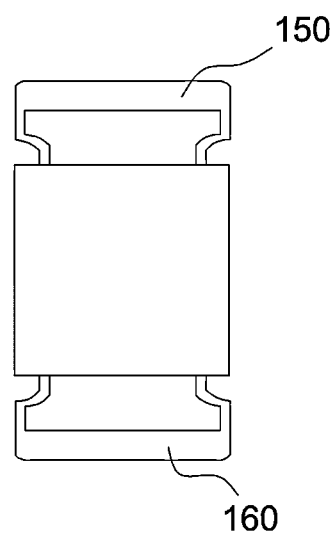
Figure 5C:
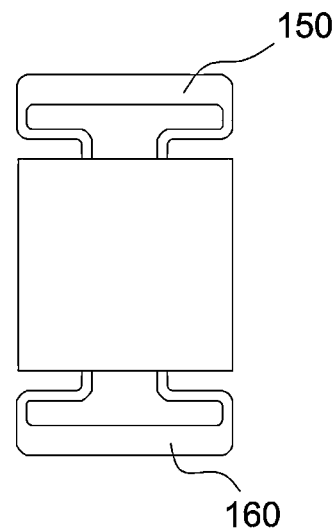
Figure 5D:
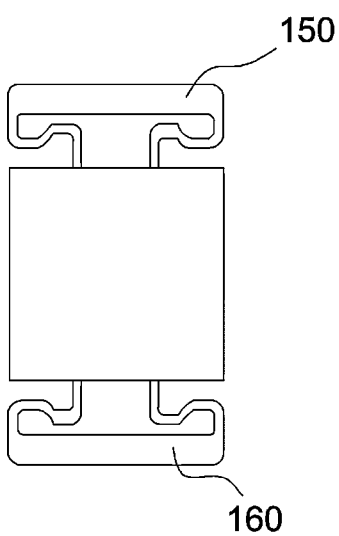

FIG. 4 shows a schematic diagram of a light path adjustment mechanism according to another embodiment of the invention. As shown in FIG. 4, a first elastic member 150 and a second elastic member 160 are disposed on two opposite sides of the optical plate member 130, the first actuator 142 is disposed overlapping the first elastic member 150, and the second actuator 144 is disposed on one side of the optical plate member 130 and located between the first elastic member 150 and the second elastic member 160 without overlapping any elastic member. Therefore, a distance between the first actuator 142 and the first elastic member 150 is smaller than a distance between the second actuator 144 and the first elastic member 150. For example, by alternating different control modes including: (1) only the first actuator 142 actuates; (2) the first actuator 142 and the second actuator 144 both actuate; and (3) only the first actuator 142 actuates, the optical plate member 130 on the carrier 120 may similarly tilt about two different axes to reach four different positions relative to the support 110. In this embodiment, each of the first elastic member 150 and the second elastic member 160 has two different sections respectively parallel to two adjacent sides of the optical plate member 130. Further, the layout of an elastic member shown in FIG. 4 is different from that shown in FIG. 1. According to various embodiments of the invention, each elastic member is not limited to a specific shape, dimension, elastic coefficient or layout of sections, as long as the elastic member is allowed to assist the optical plate member in tilting about two different axes to reach different positions. FIGS. 5A, 5B, 5C and 5D illustrate various shapes of an elastic member. As shown in FIGS. 5A to 5D, the shape of an elastic member may vary according to actual demands, such as desired tilt positions or vibration degrees, without limitation.

Figure 6A:
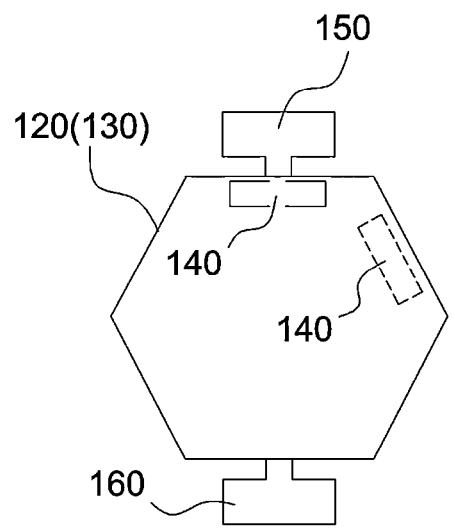
FIGS. 6A, 6B, 6C and 6D illustrate different modifications of a light path adjustment mechanism according to various embodiments of the invention.
Figure 6B:
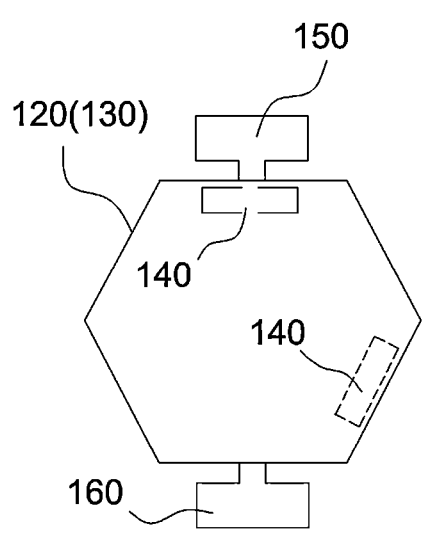
Figure 6C:
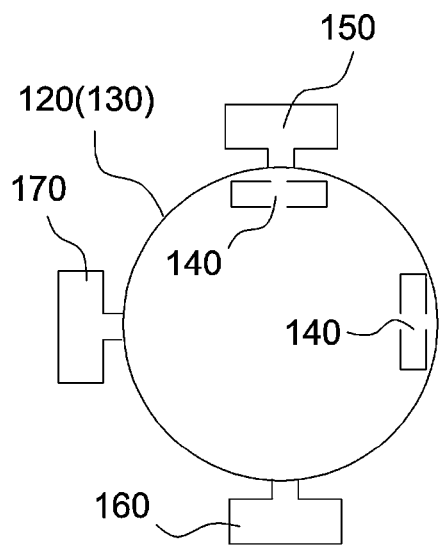
Figure 6D:
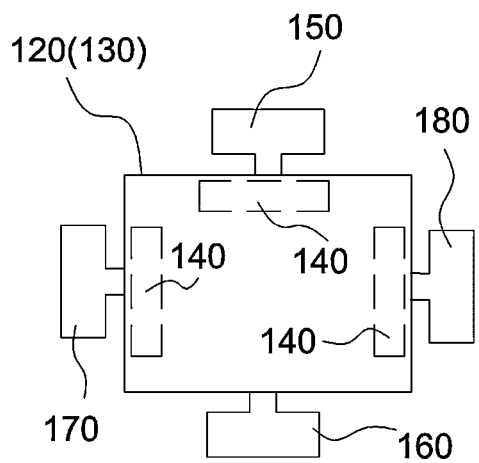

FIGS. 6A, 6B, 6C and 6D are schematic diagrams of various modifications of a light path adjustment mechanism. In various embodiments of the invention, the carrier 120 and the optical plate member 130 are not limited to a specific shape. For example, the carrier 120 and the optical plate member 130 may be in the shape of a rectangle (FIG. 6D), a circle (FIG. 6C) or a hexagon (FIG. 6A and FIG. 6B), and the number of actuators 140 may be two (FIGS. 6A, 6B and 6C) or three (FIG. 6D). Further, two actuators 140 may be disposed on two adjoining sides (FIG. 6A) or two neighboring sides (FIG. 6B). That is, the two actuators 140 may be arbitrary disposed except for the arrangement where the two actuators 140 are located on opposite sides of the carrier 120. Further, the elastic members are not limited to a specific number and distribution. For example, the elastic members may be disposed on two opposite sides of the carrier 120 (elastic members 150 and 160 shown in FIG. 6A), three adjoining sides of the carrier 120 (elastic members 150,160 and 170 shown in FIG. 6C), or around the carrier 120 (elastic members 150,160, 170 and 180 shown in FIG. 6D).

Figure 7A:
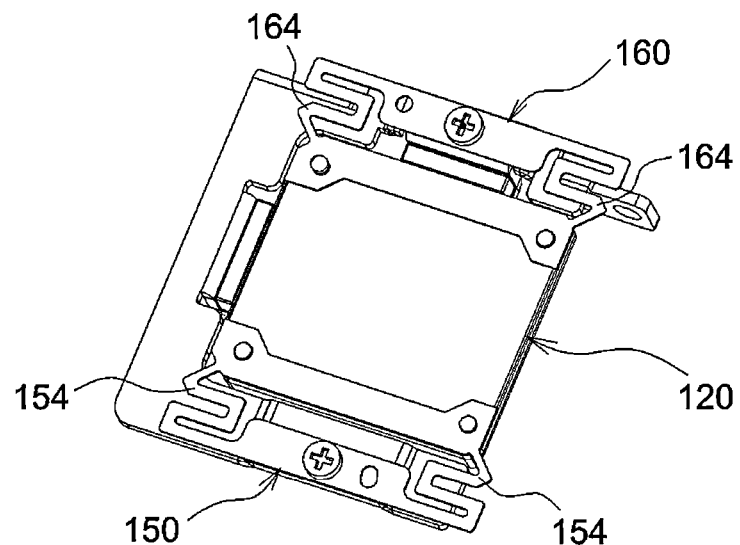
FIG. 7A shows a schematic diagram of a light path adjustment mechanism according to another embodiment of the invention.
Figure 7B:
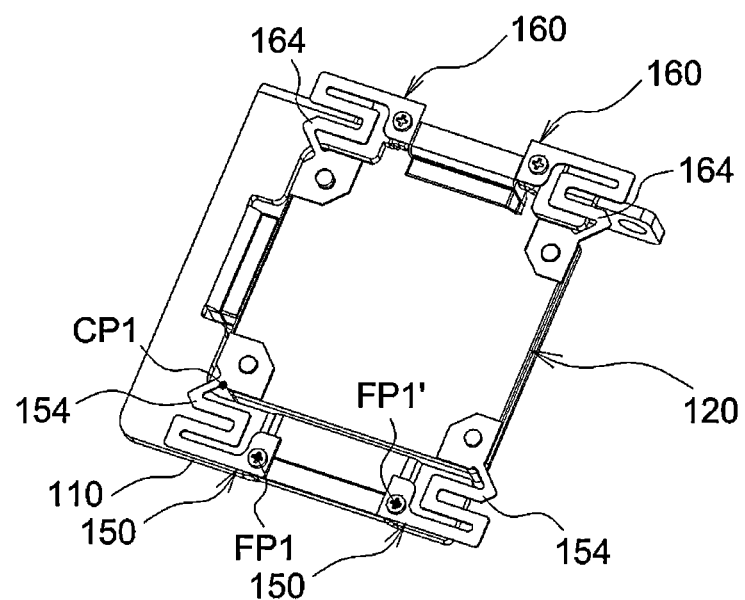
FIG. 7B shows a schematic diagram of a light path adjustment mechanism according to another embodiment of the invention.
Figure 7C:
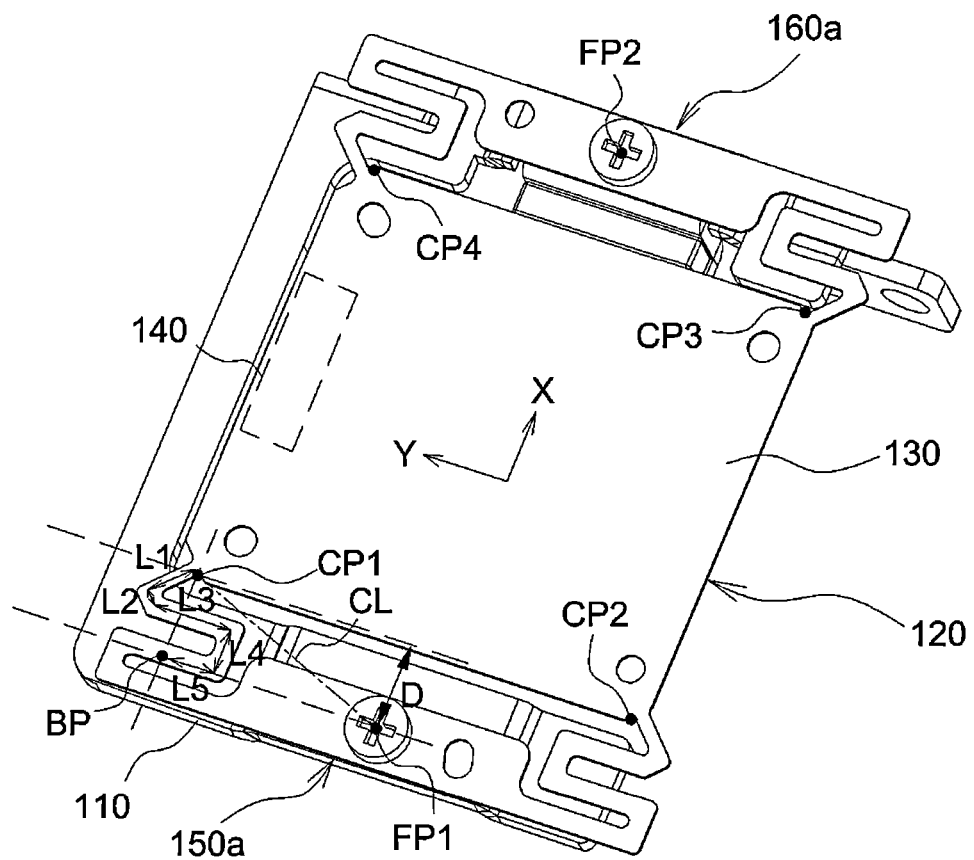
FIG. 7C shows a schematic diagram of a light path adjustment mechanism according to another embodiment of the invention.

In one embodiment, the support 110, the carrier 120, the first elastic member 150 and second elastic member 160 may be all integrally formed as one piece using the same material (such as magnetic substance). Alternatively, two or three of them may be integrally formed as one piece and are then combined with the remainder. For example, the support 110, the first elastic member 150 and the second elastic member 160 may be integrally formed as one piece using the same material, or the support 110 and the first elastic member 150 may be integrally formed as one piece using the same material. Further, the arrangement of the first elastic member 150 and the second elastic member 160 is not restricted. As shown in FIG. 1, the first elastic member 150 and the second elastic member 160 may extend and join together to form an annular and rectangular carrier 120. In other embodiment, as shown in FIG. 7A, the first elastic member 150 and the second elastic member 160 are two separate pieces respectively provided on two opposite sides of the carrier 120. Further, in situations where the first elastic member 150 and the second elastic member 160 are respectively disposed on two opposite sides of the carrier 120, two movable parts of the first elastic member 150 or the second elastic member 160 may be connected with each other (FIG. 7A) or separate from each other (FIG. 7B). That is, the elastic members 150 and 160 shown in FIG. 7A and FIG. 7B have an identical distribution and function, and the mere difference lies in that the two movable parts on the same side are connected with or separate from each other. Further, in case the optical plate member is a lens, an opening is formed in a central region of the carrier 120 that corresponds to an active area of the lens to allow light to pass. In comparison, in case the optical plate member 130 is a reflective mirror that reflects incoming light beams, the carrier 120 does not need to form an opening, as shown in FIG. 7C. Moreover, referring to FIG. 7C, in case the optical plate member 130 is a reflective mirror, the light beam striking the reflective mirror is deflected by the reflective mirror and does not pass through the optical plate member 130. Therefore, some component, such as at least one actuator 140, is allowed to be disposed under the carrier 120 (overlapping an active reflective area of the optical plate member 130) without interrupting the propagation of light to further reduce the overall occupied space.

Referring to FIG. 7C again, in one embodiment, the carrier 120 may be connected to the support 110 via a first flexible member 150a and a second flexible member 160a. The first flexible member 150a and the second flexible member 160a are disposed on two opposite sides of the carrier 120, the first flexible member 150a is connected to the support 110 via a first fixed point FP1, and the second flexible member 160a is connected to the support 110 via a second fixed point FP2. The carrier 120 is connected to the first flexible member 150a via a first connection point CP1 and a second connection point CP2 on the outer periphery of the carrier 120, and the carrier 120 is connected to the second flexible member 160a via a third connection point CP3 and a fourth connection point CP4 on the outer periphery of the carrier 120. The optical plate member 130 is disposed on the carrier 120 and tilt or rotate about a first axial direction (such as the X-axis direction) and/or a second axial direction (such as the Y-axis direction), and the first connection point CP1 and the second connection point CP2 are disposed on two opposite sides of the first axial direction (such as the X-axis direction). In this embodiment, a distance D measured in the first axial direction (such as the X-axis direction) between the first fixed point FP1 and the first connection point CP1 of the first flexible member 150a is smaller than a total length of the first flexible member 150a measured from a reference point BP to the first connection point CP1. The reference point BP is an intersection point crossed by a virtual line extending from the first fixed point FP1 in a direction parallel to the second axial direction (such as the Y-axis direction) and a virtual line extending from the first connection point CP1 in a direction parallel to the first axial direction (such as the X-axis direction). The total length is the sum of lengths of all sections of the first flexible member 150a connected between the first connection point CP1 and the reference point BP on the first flexible member 150a. As shown in FIG. 7C, a total length of the first flexible member 150a from the first connection point CP1 to the reference point BP is equal to the sum of lengths of sections L1, L2, L3, L4 and L5. Further, in this embodiment, a connecting line CL between the first fixed point FP1 and the first connection point CP1 is not parallel to the first axial direction (such as the X-axis direction) and the second axial direction (such as the Y-axis direction). Moreover, as shown in FIG. 7B, a same flexible member/elastic member may be connected to the support via multiple fixed points; for example, the elastic member 150 may be connected to the support 110 via two fixed points FP1 and FP1'. Under the circumstance, the afore-mentioned first fixed point relative to the first connection point CP1 of the first flexible member 150a is defined as the fixed point closest to the first connection point CP1, i.e. the fixed point FP1.

Figure 8:
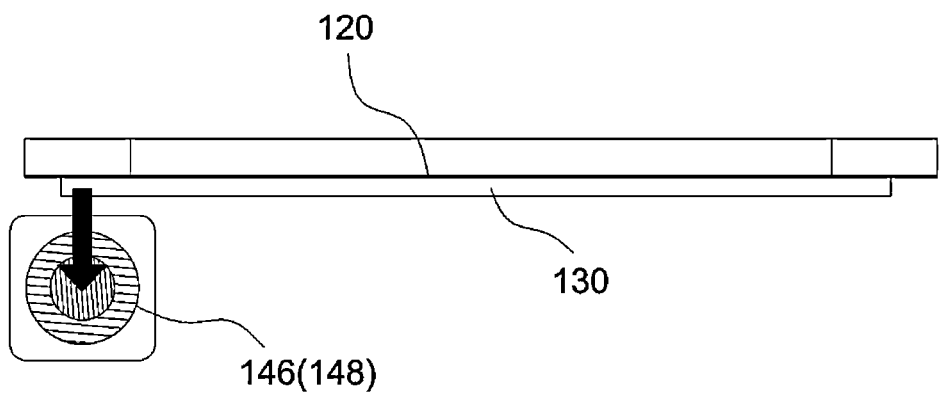
FIG. 8 shows a schematic diagram of an actuator according to an embodiment of the invention.
Figure 9A:
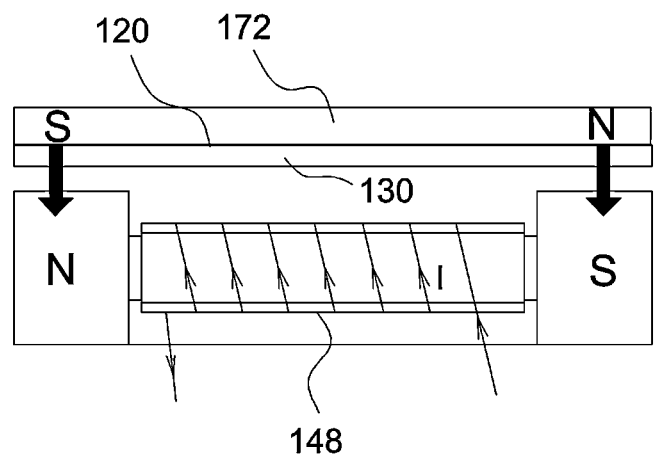
FIGS. 9A and 9B show schematic diagrams of an actuator according to another embodiment of the invention.
Figure 9B:
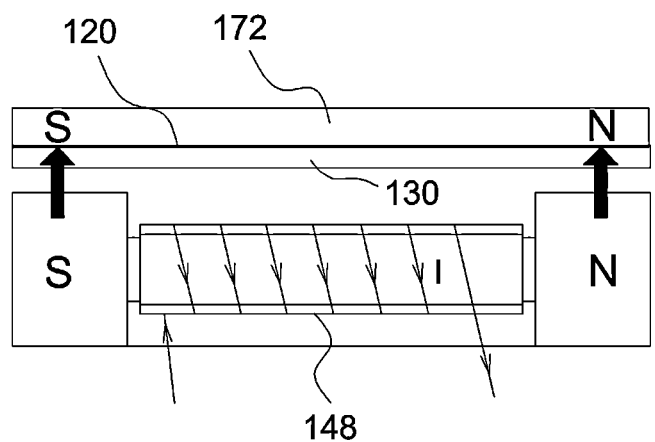
Figure 10:
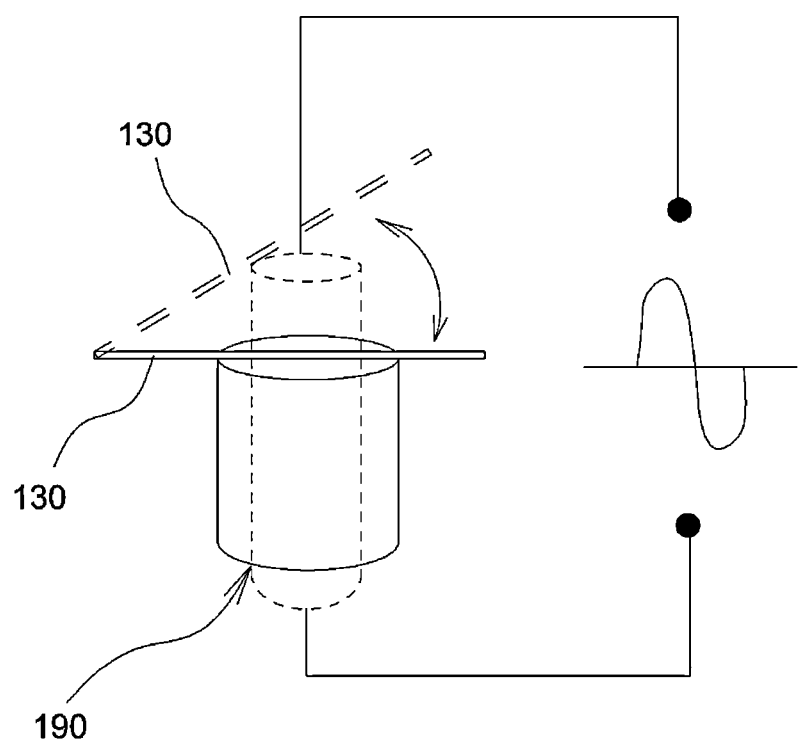
FIG. 10 shows a schematic diagram of an actuator according to another embodiment of the invention.

In various embodiments of the invention, the structure and operation of the actuator 140 are not limited to a specific manner, as long as an action force for titling or rotating the optical plate member can be provided. For example, in one embodiment, the carrier 120 for holding the optical plate member 130, the support 110 or extension portions of the elastic members 150 and 160 may be formed from a magnetic material, and the actuator 140 may include a coil 146 or an electromagnet 148 shown in FIG. 8. When the coil 146 or the electromagnet 148 is energized, an attractive force is generated to attract the carrier 120, which causes one end of the optical plate member 130 to move downwardly to allow the optical plate member 130 to tilt. In other embodiment, as shown in FIG. 9A and FIG. 9B, the carrier 120 for holding the optical plate member 130, the support 110 or extension portions of the elastic members 150 and 160 may be formed from a non-magnetic material, and the actuator 140 may include a permanent magnet 172 on the carrier 120 and an electromagnet 148 under the carrier 120. As shown in FIG. 9A, the permanent magnet 172 is disposed on the carrier 120 and has a south pole S (on the left side) and a north pole N (on the right side), and the electromagnet 148 has a north pole N (on the left side) and a south pole S (on the right side) to attract the permanent magnet 172 and cause one end of the optical plate member 130 to move downwardly. In comparison, as shown in FIG. 9B, when the electromagnet 148 reverses the flow direction of a current I and exchanges magnetic polarities, the electromagnet 148 has a south pole S (on the left side) and a north pole N (on the right side) to repel the permanent magnet 172 and cause another end of the optical plate member 130 to move upwardly. Therefore, the alternating attraction and repulsion causes the optical plate member 130 to reciprocally tilt to reach various positions. Further, in this embodiment, an actuator that generates both attractive and repulsive forces for tilting the optical plate member 130 may achieve a greater degree of vibration. In other embodiment, as shown in FIG. 10, the actuator may include a piezoelectric element 190. The piezoelectric element 190 may deform and change in shape when an electric field is applied, converting electrical energy into mechanical energy, to cause reciprocating motion of the optical plate member 130.

Figure 11:
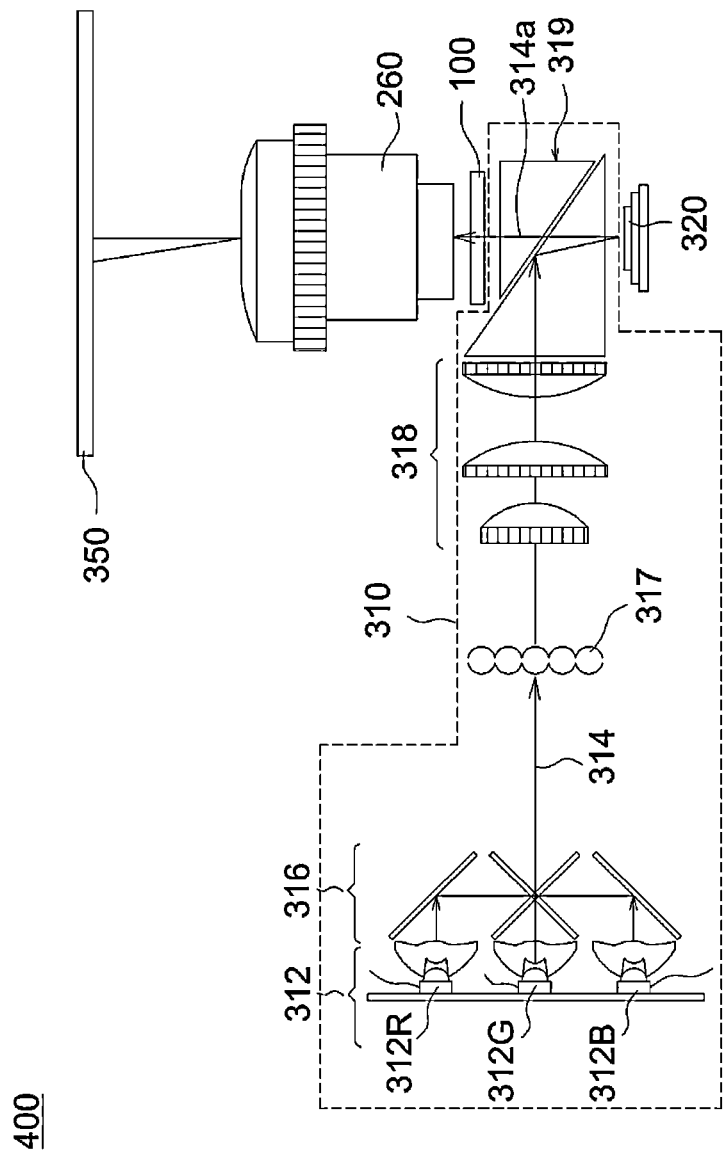
FIG. 11 shows a schematic diagram of a light path adjustment mechanism used in a projector according to an embodiment of the invention.
Figure 12:
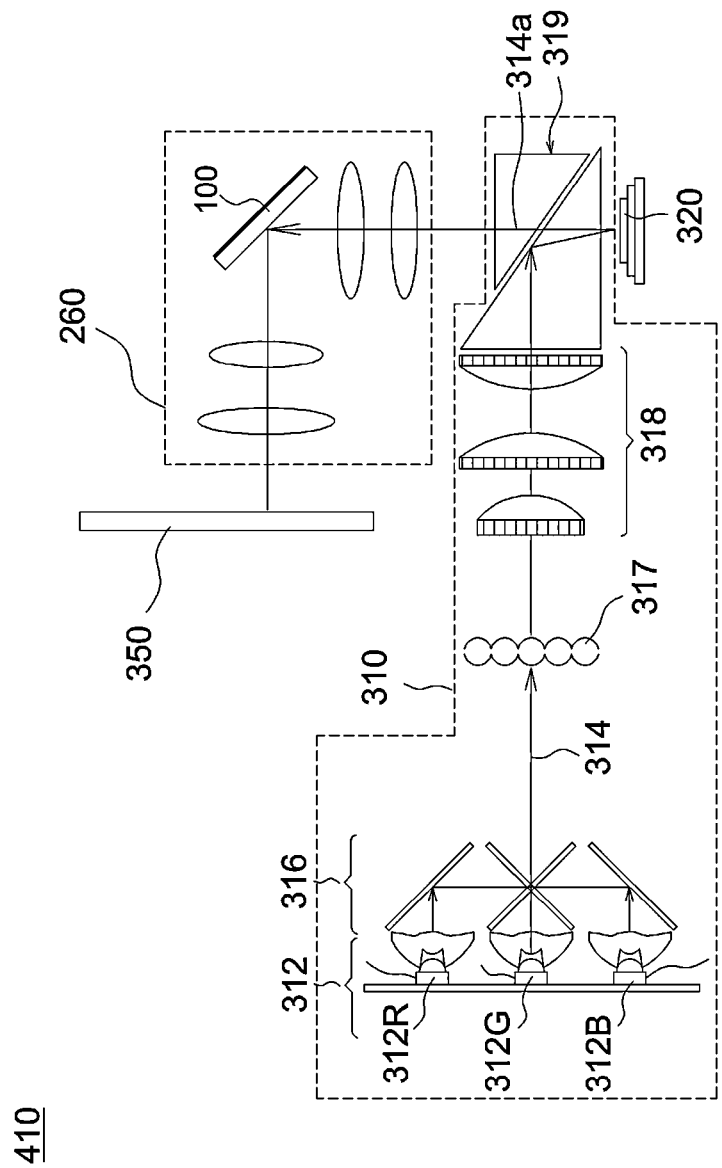
FIG. 12 shows a schematic diagram of a light path adjustment mechanism used in a projector according to another embodiment of the invention.

FIG. 11 shows a schematic diagram of a light path adjustment mechanism used in a projector according to an embodiment of the invention. Referring to FIG. 11, a projector 400 includes an illumination system 310, a light valve 320, a projection lens 330 and a light path adjustment mechanism 100. The illumination system 310 has a light source 312 for providing a light beam 314, and the light valve 320 is disposed in a propagation path of the light beam 314 and converts the light beam 314 into multiple sub images 314a. Besides, the projection lens 330 is disposed in a propagation path of the sub images 314a, and the light valve 320 is disposed between the illumination system 310 and the projection lens 330. Further, the light path adjustment mechanism 100 may be disposed in the projection lens 330. The light source 312 may, for example, include a red LED 312R, a green LED 312G and a blue LED 312B. Light from each of the LEDs 312R, 312G and 312B are combined by a light combiner 316 to form the light beam 314, and the light beam 314 passes a fly-eye lens array 317, a lens assembly 318 and the TIR Prism 319 in succession. Then, the light beam 314 is reflected by the TIR Prism 319, directed to the light valve 320, and converted into multiple sub images 314a by the light valve 320. The sub images 314a pass the TIR Prism 319 and are projected on a screen 350 by the projection lens 330. In this embodiment, when the sub images 314a reach the light path adjustment mechanism 100, the light path adjustment mechanism 100 may reflect the sub images 314a and alter the propagation path of the sub images 314a. Therefore, at a first time point the sub images 314a are projected on a first position (not shown) of the screen 350 by the light path adjustment mechanism 100, at a second time point the sub images 314a are projected on a second position (not shown) of the screen 350 by the light path adjustment mechanism 100, and the second position is away from the first position for a distance in a horizontal direction and/or a vertical direction. In this embodiment, the light path adjustment mechanism 100 is allowed to horizontally and/or vertically shift the position of the sub images 314a for a distance to therefore improve horizontally and/or vertically image resolutions. Although the light path adjustment mechanism is described herein as being applied to the projector 400, in other embodiments, the light path adjustment mechanism can be applied to different optical systems to achieve different effects without limitation. Besides, the arrangement and position of the light path adjustment mechanism in an optical system are not restricted. For example, in other embodiment, the light path adjustment mechanism 100 may be disposed in the projection lens 260 of an optical device 410 as shown in FIG. 12.

The term "light valve", which is commonly known in the projector industry, refers to individually-addressed optical units of a spatial light modulator. The spatial light modulator includes multiple individually-addressed optical units arranged as a one-dimensional or a two-dimensional array. Each optical unit can be individually addressed by optical or electrical signals to alter its optical properties through various physical effects (e.g., Pockels effect, Kerr effect, photoacoustic effect, pagneto-optic effect, self electro-optic effect or photorefractive effect). Therefore, the multiple individually addressed optical units may modify incoming light beams and output image beams. The optical units may be, for example, micro mirrors or liquid crystal cells, and the light valve may be a digital micro-mirror device (DMD), a liquid-crystal-on-silicon panel (LCOS panel) or a transmissive type LCD panel.

A projector is an apparatus capable of casting an image on a screen through optical projection. In the projector industry, a variety of different types of projectors, which are distinguished from each other by the type of a light valve, may include a cathode-ray-tube type, a liquid-crystal-display (LCD) type, a digital-light-projector (DLP) type or a liquid-crystal-on-silicon (LCOS) type. An LCD-type projector that uses an LCD as a light valve is a transmissive type projector. A DLP-type projector using digital micro-mirror devices as a light valve and an LCOS-type projector using liquid crystal on silicon as a light valve are reflective type projectors that project images through light reflection.

Though the embodiments of the invention have been presented for purposes of illustration and description, they are not intended to be exhaustive or to limit the invention. Accordingly, many modifications and variations without departing from the spirit of the invention or essential characteristics thereof will be apparent to practitioners skilled in this art. It is intended that the scope of the invention be defined by the claims appended hereto and their equivalents in which all terms are meant in their broadest reasonable sense unless otherwise indicated.

What is claimed is:

1. A light path adjustment mechanism, comprising:
    a support;
    a carrier disposed on the support and connected to the support via a first elastic member and a second elastic member, an outer periphery of the carrier being connected with the first elastic member to form a first connection area and a second connection area, the outer periphery of the carrier being connected with the second elastic member to form a third connection area and a fourth connection area, the first connection area and the second connection area defining a first middle area between the first connection area and the second connection area, the second connection area and a third connection area defining a second middle area between the second connection area and a third connection area, the third connection area and the fourth connection area defining a third middle area between the third connection area and the fourth connection area, and the fourth connection area and the first connection area defining a fourth middle area between the fourth connection area and the first connection area;
    an optical plate member disposed on the carrier; and
    a plurality of actuators disposed on at least two and at most three middle areas of the first, the second, the third and the fourth middle areas.

2. The light path adjustment mechanism as claimed in claim 1, wherein at least one of the plurality of actuators is dispose on an area overlapping the first elastic member.

3. The light path adjustment mechanism as claimed in claim 1, wherein each of the first elastic member and the second elastic member has a first section and a second section extending in mutually different directions.

4. The light path adjustment mechanism as claimed in claim 1, wherein the plurality of actuators comprises a first actuator and a second actuator, a distance between the first elastic member and the first actuator is smaller than a distance between the first elastic member and the second actuator.

5. The light path adjustment mechanism as claimed in claim 1, wherein the plurality of actuators comprises a first actuator and a second actuator, and the first actuator and the second actuator are located on a same side of a diagonal line of the carrier.

6. The light path adjustment mechanism as claimed in claim 1, wherein the optical plate member comprises a mirror or a lens.

7. The light path adjustment mechanism as claimed in claim 1, wherein each of the actuators comprises a coil or an electromagnet.

8. The light path adjustment mechanism as claimed in claim 1, wherein each of the actuators comprises a permanent magnet on the carrier and an electromagnet under the carrier.

9. A light path adjustment mechanism, comprising:
  a support;
  a carrier disposed on the support and connected to the support via a first elastic member and a second elastic member, the carrier comprising a first side, a second side opposite the first side, a third side and a fourth side opposite the third side, and each of the third side and the fourth side being located between the first side and the second side;
  an optical plate member disposed on the carrier and capable of being tilted about at least one of a first axial direction and a second axial direction; and
  at least one actuator disposed on at least one of the first side, the second side, the third side and the fourth side, wherein the first elastic member is connected to the support via a first fixed point, the carrier is connected to the first elastic member via a first connection point and a second connection point on an outer periphery of the carrier, and a connecting line between the first fixed point and the first connection point is not parallel to the first axial direction and the second axial direction.

10. The light path adjustment mechanism as claimed in claim 9, wherein the first elastic member is disposed on the first side and the second elastic member is disposed on the second side.

11. The light path adjustment mechanism as claimed in claim 9, wherein the at least one actuator is dispose on an area overlapping the first elastic member.

12. The light path adjustment mechanism as claimed in claim 9, wherein each of the first elastic member and the second elastic member has a first section and a second section extending in mutually different directions.

13. The light path adjustment mechanism as claimed in claim 9, wherein the at least one actuator comprises a first actuator and a second actuator, a distance between the first elastic member and the first actuator is smaller than a distance between the first elastic member and the second actuator.

14. The light path adjustment mechanism as claimed in claim 9, wherein the at least one actuator comprises a first actuator and a second actuator, and the first actuator and the second actuator are located on a same side of a diagonal line of the carrier.

15. The light path adjustment mechanism as claimed in claim 9, wherein the optical plate member comprises a mirror or a lens.

16. The light path adjustment mechanism as claimed in claim 9, wherein the at least one actuator comprises a coil or an electromagnet.

17. The light path adjustment mechanism as claimed in claim 9, wherein the at least one actuator comprises a permanent magnet on the carrier and an electromagnet under the carrier.

18. A light path adjustment mechanism, comprising:
  a support;
  a carrier disposed on the support and connected to the support via a first flexible member and a second flexible member, the first flexible member and the second flexible member being disposed on two opposite sides of the carrier, the first flexible member being connected to the support via a first fixed point, the second flexible member being connected to the support via a second fixed point, the carrier being connected to the first flexible member via a first connection point and a second connection point on an outer periphery of the carrier, and the carrier being connected to the second flexible member via a third connection point and a fourth connection point on the outer periphery of the carrier; and
  an optical plate member disposed on the carrier and capable of being tilted about at least one of a first axial direction and a second axial direction, the first connection point and the second connection point being disposed on two opposite sides of the first axial direction, a distance between the first fixed point and the first connection point measured in the first axial direction being smaller than a total length measured from a reference point to the first connection point, the reference point being an intersection point crossed by a virtual line extending from the first fixed point in a direction parallel to the second axial direction and a virtual line extending from the first connection point in a direction parallel to the first axial direction, and the total length is a sum of lengths of all sections of the first flexible member connected between the first connection point and the reference point.

19. The light path adjustment mechanism as claimed in claim 18, wherein all sections of the first flexible member connected between the first connection point and the reference point extending in at least two different directions.

20. The light path adjustment mechanism as claimed in claim 18, wherein the optical plate member comprises a mirror or a lens.

* * * * *